United States Patent [19]

Barrett

[11] 4,217,865
[45] Aug. 19, 1980

[54] INTERNAL COMBUSTION ENGINE

[76] Inventor: George M. Barrett, R.R. #5, Galt, Ontario, Canada, N1R 5S6

[21] Appl. No.: 849,863

[22] Filed: Nov. 9, 1977

[51] Int. Cl.² .............................................. F01L 11/02
[52] U.S. Cl. .............................. 123/47 A; 123/56 AA; 123/317; 92/183
[58] Field of Search ............. 123/47 R, 47 A, 47 AA, 123/56 R, 56 A, 56 AA, 75 RC, 75 CC, 193 P, 188 GC; 92/183

[56] References Cited

U.S. PATENT DOCUMENTS

| | | | |
|---|---|---|---|
| 657,576 | 9/1900 | Smith | 123/56 AA |
| 1,133,057 | 3/1915 | Panosh | 123/47 A |
| 1,139,713 | 5/1915 | Osterman | 123/47 R |
| 1,193,367 | 8/1916 | Derr | 123/47 A |
| 2,194,863 | 3/1940 | Merry | 123/47 A |
| 2,274,644 | 3/1942 | Arden | 123/47 A |
| 2,375,183 | 5/1945 | Arden | 123/47 R |
| 2,393,542 | 1/1946 | Kramer | 123/47 A |
| 2,506,250 | 5/1950 | Taub | 123/56 AA |
| 2,778,352 | 1/1957 | Kimberly | 123/188 GC |
| 2,781,031 | 2/1957 | Barberi | 123/47 A |
| 3,340,854 | 9/1967 | Foster | 123/47 AA |
| 3,831,565 | 8/1974 | Avery | 123/47 R |

Primary Examiner—Charles J. Myhre
Assistant Examiner—Craig R. Feinberg
Attorney, Agent, or Firm—Charles E. Brown

[57] ABSTRACT

An internal combustion engine having a piston assembly such that gaseous flow into a cylinder is through the piston assembly and wherein all gaseous flow in a cylinder is in a single direction. The piston assembly includes inner and outer piston members which are relatively movable so as to form a gaseous passage therethrough in certain conditions. The engine also features a special valve mounting arrangement and a special crankshaft construction.

10 Claims, 4 Drawing Figures

INTERNAL COMBUSTION ENGINE

This invention relates in general to new and useful improvements in internal combustion engines, and more specifically to an internal combustion engine of the four stroke cycle type.

It is well known that in order to obtain maximum power and efficiency from an internal combustion engine, it is necessary that the engine freely breath. In other words, it is necessary that there be an efficient flow of gases into and out of a cylinder.

A conventional internal combustion engine of the four stroke cycle type has a breathing deficiency because of two elementary difficulties. The first is that the direction of incoming gases is the reverse of that of outflowing gases. Accordingly, there are turbulences set up within the cylinder which are inefficient. Secondly, in the normal internal combustion head construction there is insufficient space for the required valves and the fuel igniter. As a result, there are limitations as to the sizes of valves.

In accordance with this invention, it is proposed to deliver incoming gases into a cylinder below the piston and to construct the piston so that there may be gaseous flow therethrough with the piston functioning as an intake valve. Thus the usual large intake valve is removed from the head, thereby permitting a large exhaust valve.

Another feature of this invention is to provide a novel piston assembly which includes an inner piston member carried by the connecting rod in the usual manner and an outer piston member which is axially displaceable with respect to the inner piston member so as to define a gaseous passage around the inner piston member and out through the usual head of a piston. The inner and outer piston members have sealing surfaces which close off the gaseous passage during all of the stroke cycles of the engine except for the intake stroke. The piston assembly is of a simple construction and the relationship of the inner and outer members is such that no springs are required to effect the function of the piston assembly as an intake valve.

Another feature of the internal combustion engine is the mounting of the exhaust valve. The exhaust valve is carried by a simple guide which is seated in the head against movement into the cylinder and the usual valve spring serves not only to urge the exhaust valve to its normally closed position, but also to constantly urge the valve guide into its seated position in the head.

Another feature of the internal combustion engine is the crankshaft construction, the crankshaft being of a sectional construction and including members having crank pins extending therefrom in transversely offset relation with end portions of the crank pins overlapping. The crank members are joined by a throw member which receives the overlapping ends of the crank pins with the crank pins being secured to the throw member by means of a simple pin driven through aligned apertures in the crank pins and the throw member.

The novel construction of the crankshaft, the piston assemblies and the valve mounting permits other beneficial features as will be described in more detail hereinafter.

With the above and other objects in view that will hereinafter appear, the nature of the invention will be more clearly understood by reference to the following detailed description, the appended claims, and the several views illustrated in the accompanying drawings.

Figure 2:
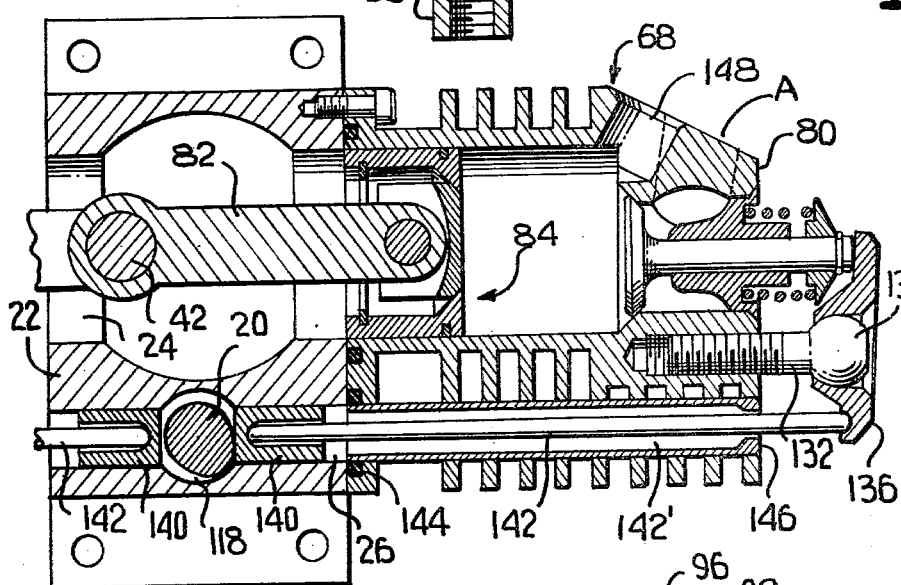
FIG. 2 is a fragmentary vertical sectional view taken through one of the cylinders in the crankcase of the engine and shows the means for actuating the exhaust valve.
Figure 3:
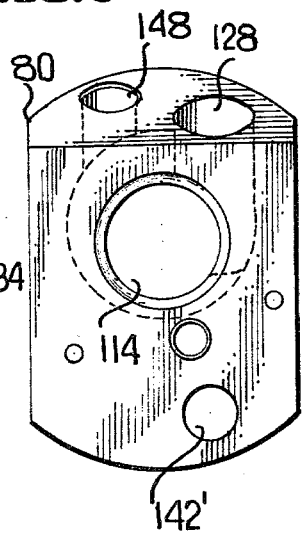
FIG. 3 is an end view of one of the cylinder units and shows the arrangement of various functional openings therein.

Referring now to the drawings in detail, it will be seen that the internal combustion engine is generally identified by the numeral 10 and includes a hollow crankcase 12 which may be cast in one piece. The crankcase 12 has a primary passage 14 in which a sectional crankshaft, generally identified by the numeral 16, is mounted. As is best shown in FIG. 2, the crankcase 12 also defines a cam shaft passage 18 in which a cam shaft 20 is journalled for rotation.

As mentioned above, the internal combustion engine 10 is of the flat or pancake four cylinder type with the cylinders being disposed in generally opposed relation. As a result, the crankcase 12 is generally rectangular in cross section and has opposite surfaces 22 to which cylinder units may be removably secured in a manner to be described hereinafter. Each surface 22 is provided with an opening 24 which places the interior of the crankcase 12 into communication with each cylinder unit below its respective piston. Each surface 22 also has formed therein normal to the cam shaft passage 18 a guide passage 26 as will be described hereinafter.

Referring once again to FIG. 1, it will be seen that opposite ends of the crankcase 12 are opened and are closed by end plates 30 and 32, respectively. The end plate 30 carries a bearing 34 while the end plate 32 carries a bearing 36. The crankshaft 16 is rotatably journalled within the bearings 34, 36.

The crankshaft 16 will now be specifically described. As set forth above, the crankshaft 16 is of a sectional construction and includes a central member 38 having crank pins 40, 42 projecting therefrom. In the illustrated embodiment of the invention, the crank pins 40, 42 are in alignment with one another.

The crankshaft 16 also includes end members 44 and 46. The end member 44 includes a shaft portion 48 carried by the bearing 34 and extended out through the end plate 30. The shaft portion 38 terminates in a shaft portion 50 to which a drive element (not shown) may be suitably secured by way of a key or the like. While no seal has been illustrated, it is understood that it may be desirable to provide a seal between the shaft portion 48 and the end plate 30.

The end member 46 has a shaft portion 52 which is carried by the bearing 36. It is to be noted that the shaft portion 52 terminates within the end plate 32 and no seal is required. The shaft portion 52 carries a drive gear 54 which is meshed with a driven gear (not shown) of the cam shaft 20 for rotating the cam shaft 20 at one half of the rotational speed of the crankshaft 16, as is conventional in four stroke cycle engines.

It is to be noted that the end members 44 and 46 carry crank pins 56, 58, respectively, which in the illustrated engine are in opposed relation. The crank pin 56 longitudinally overlaps the crank pin 40 and is in transversely spaced, 180° out of phase relation with respect thereto. The crank pins 40, 56 have a very tight fit in a throw member 60 which joins the central member 38 and the end member 44. A suitable drive pin 62, which may be of the hollow split sleeve type is driven through aligned apertures in the throw member 60 and the crank pins 40, 56 to interlock these components of the crankshaft 16.

The crank pin 58 overlaps the crank pin 42 in a longitudinal direction and is transversely spaced therefrom in 180° out of phase relation in the same manner as that described with respect to the crank pins 40, 56. The crank pins 42, 58 are joined by a throw member 64 and are locked together by a drive pin 66.

Four cylinder units, which are identical and each of which is identified by the numeral 68, are secured to the crankcase 12 by means of bolts 70. Each cylinder unit 68 is sealed relative to the crankcase 12 by means of a sealing ring 72.

It is to be noted that each cylinder unit 68 includes a cylinder barrel 74 defining a cylinder 76 and the illustrated engine being an air cooled engine, each cylinder barrel 74 is provided with cooling fins 78. Each cylinder barrel 74 is provided with an integral head 80 which will be described in more detail hereinafter.

Each of the crank pins 40, 42, 56, 58 has journalled thereon the large end of a connecting rod 82. While no bearings have been illustrated, if bearings are desired either plain or anti-friction bearings may be utilized in a conventional manner. Each connecting rod 82 extends into the respective cylinder 76 and has mounted thereon a piston assembly formed in accordance with this invention, each piston assembly being generally identified by the numeral 84.

Each piston assembly 84 includes an outer piston member 86 which includes a skirt portion 88 and an annular head portion 90. The annular head portion 90 defines an opening 92 through the outer piston member 86. The underside of the annular head portion 90 is at least in part conical so as to define a valve seat 94. The lower part of the skirt 88 is provided with a removable snap ring or retainer ring 96.

Figure 4:
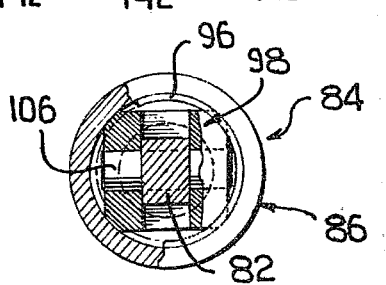
FIG. 4 is a transverse sectional view taken through one of the piston assemblies and shows the specific cross sections of the members forming the same.

Each piston assembly 84 also includes an inner piston member 98 which, as is best shown in FIG. 4, is generally rectangular in cross section as compared to the circular cross section of the interior of the skirt 88. The inner piston member 98 includes a head 100 and a base 102. The head 100 has an outer peripheral surface in the form of a conical valve surface 104 which matches the valve surface 94 of the head portion 90 so as to form a seal therewith.

The inner cylinder member 98 is secured to the connecting rod 82 by means of a piston pin 106. It is also to be understood that the height of the inner piston member 98 is less than the internal height of the outer piston member 86 so that when the base 102 is engaged with the locking ring 96, the valve surfaces 94 and 104 are spaced apart and there is a gaseous flow passage 108 formed entirely through the piston assembly for the flow of gases from the crankcase 12 into the respective cylinder.

Although the outer piston member 86 has been illustrated without rings, it is to be understood that if desired, it may be provided with the same. It is also to be noted that while the inner piston member 98 is of a generally square cross section, it does have rounded corners so that the inner piston member 98 is generally guided within the outer piston member 86. Further, the corner portions only of the base 102 engage the locking ring 96 but on the other hand the extent of the sealing surface 104 is sufficient to provide a complete annular seal with the sealing surface 94.

It is to be understood that the piston assembly 84 functions as the intake valve for each cylinder. Accordingly, each cylinder unit 68 is provided with but a single valve, this being an exhaust valve 110. Each exhaust valve 110 is of a conventional construction and seats on a valve seat 112 suitably formed within the head 80.

The head 80 is provided with a through passage 114 from within the respective cylinder 76 to the outer surface of the head. The valve seat 112 surrounds the through passage 114. A valve guide 116 is seated within the outer end of the through passage 114 and has a frusto-conical seating surface 118 which is engaged with a like frusto-conical seating surface 120 formed on the head 80 surrounding the outer end of the through passage 114. The stem of the exhaust valve 110 guidingly passes through the valve guide 116. A valve spring 122 bears against the valve guide 116 and reacts against a spring retainer 124 carried by the stem of the valve 110 and retained thereon by means of a suitable lock 126. It would be readily apparent that the valve spring 122 has a dual function. Not only does it urge the exhaust valve 110 to a closed position, but always urges the valve guide 116 to a seated position within the head 80.

It is to be understood that the through passage 114 forms part of the exhaust port. However, the main portion of the exhaust port which is identified by the numeral 128, opens out through an end face 130 of the head 80 (FIG. 2). It is to be understood that the exhaust passage or port 128 will be of sufficient size in accordance with the size of valve seat 112 and the exhaust valve 110. It is also pointed out here that the diameter of the exhaust valve 112 is very large in proportion to the diameter of the cylinder 76 and is at least equal to if not greater than one half of the diameter of the cylinder 76. This, of course, provides for very efficient exhaust of gases from within the respective cylinder 76.

Referring now to FIG. 2, it will be seen that the exhaust valve 110 is actuated in timed relation with the rotation of the crankshaft 16 by means of a conventional valve train. First of all, the head has threaded thereinto a rocker stud 132 with a ball head 134. Engaging the ball head 134 is a conventional rocker arm 136 which has one end thereof engaging the free end of the stem of the exhaust valve 110. The opposite end of the rocker arm 136 engages a push rod 138. It is to be understood that the rocker arm 136 is adjusted by threading the rocker post 132 relative to the head 80.

Each guide passage 26 has positioned therein a conventional cam follower 140 which engages a respective lobe of the cam shaft 20. The inner end of the push rod 138 is seated in the cam follower or lifter 140 with the push rod 138 extending through a bore 142 in the cylinder unit 68 disposed parallel to the axis of the cylinder 78. The bore 142 is sealed relative to the crankcase 12 by means of a sealing ring 144. The outer end of the bore 142 may be provided with a suitable guide 146 for the push rod 142.

At this time it is pointed out that the internal combustion engine 10 could be one of several types. For example, it could be a diesel engine. On the other hand, it most likely will be a gas engine utilizing gasoline or alcohol as its fuel. In any event, the head 80 is provided with a further passage 148 opening into the cylinder 78. In the illustrated form of the invention, the passage 148 is intended to have threaded therein a conventional igniter in the form of a spark plug. It is also feasible that it would have threaded therein part of a fuel injection system.

The engine 10 being a four cylinder engine, it will be seen that each of the pistons thereof are at the ends or beginnings of each of the four strokes. In order to best described the operation of the engine 10, the four cylinders thereof are designated by the letters A, B, C and D. The cylinders A and B are disposed in side-by-side relation as are the cylinders C and D. Generally speaking, the cylinder A opposes the cylinder C, while the cylinder B opposes the cylinder D.

In order that the operation of the engine 10 is to be fully understood, it is to be assumed that it is a gas engine utilizing a fuel-air mixture supplied through the crankcase 12 utilizing a suitable carburetion system (not shown) with flow through the two respective longitudinal halves of the crankcase 12 being controlled by suitable passages, such as the passage 150 formed in the central member 38 of the crankshaft 16. The two halves of the crankcase 12 will be internally pressurized in a manner to be described hereinafter.

Figure 1:
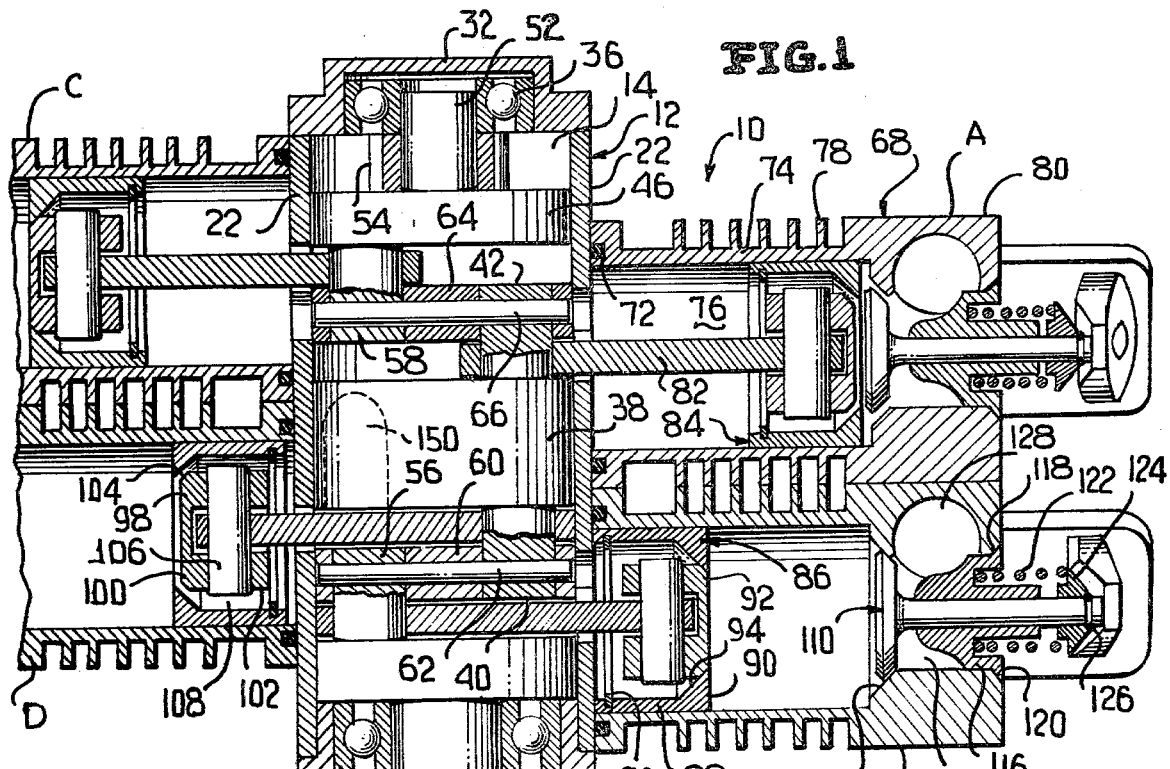
FIG. 1 is a horizontal sectional view taken through a flat four cylinder opposed cylinder engine constructed in accordance with this invention.

Referring now to FIG. 1, it will be seen that the piston of cylinder A is in its outstroke position with the outer piston member 86 having moved outwardly beyond the inner piston member 98 due to inertial forces. At this point the exhaust valve is closed and the piston assembly 84 is open to function as an intake valve.

As the crankshaft 16 rotates, the inner piston member 98 of cylinder A is moved inwardly engaging the locking ring 96 and drawing the outer piston member 86 inwardly therewith but in the intake position of the piston assembly. Gases within the inner part of the cylinder A as well as those within the inner part of cylinder C will be compressed by the inward movement of the pistons in those two cylinders thereby forcing the fuel-air mixture disposed therein through the piston assembly 84 of cylinder A so as to fill cylinder A above the piston thereof with a fuel-air mixture at a pressure above atmospheric pressure.

The piston of cylinder A will continue to move inwardly on the intake stroke thereof until it reaches its innermost position. At that time, as shown with respect to cylinder B, the inner piston member 98 will stop its inward movement and due to the inertial forces thereon, the outer piston member 86 will continue to move inwardly so as to effect a seating of the sealing surfaces 94, 104, thereby closing the intake valve.

Referring now to cylinder D, it will be seen that as the inner piston member 98 thereof moves outwardly, even if the outer piston member 86 has not reached a fully closed position, closing will be effected and thereafter the piston of cylinder B will move outwardly on the compression stroke. At this time the intake valve is maintained in its closed position both by the fact that only the inner piston member 98 is being physically moved and by the pressure exerted on the head of the piston assembly.

It is to be understood that as the pistons of cylinders B and D move outwardly, a vacuum will be drawn in the portion of the crankcase 12 associated therewith and that the fuel-air inlet port 150 will be open to the carburetor so as to permit a fuel-air mixture to be drawn into the adjacent portion of the crankcase 12.

Referring now to cylinder C it will be seen that the piston assembly of that cylinder, which has reached the end of its compression stroke, remains in its closed position and ignition of the fuel-air mixture compressed within cylinder C is in order. The ignition of the fuel-air mixture will exert a compressive force on the piston assembly of cylinder C and simultaneously urge both the outer piston member 86 and the inner piston member 98 inwardly while maintaining the seal between the two members so that the intake valve remains closed.

On the firing stroke, the piston will move inwardly until it reaches its innermost position, as is shown with respect to cylinder B. At this time, the intake valve still remains closed. As the connecting rod for the piston assembly for cylinder B moves the piston assembly outwardly, an exhaust of the burnt gases will occur. It is pointed out here that no attempt has been made to specifically illustrate the timing of the exhaust valves 110. With particular reference to cylinder B, it is to be understood that the exhaust valve may be open at this time or will open shortly afterwards. As the piston assembly of cylinder B moves outwardly, the exhaust gases therein are directed out through the exhaust port 128.

When the piston assembly reaches its outermost movement on the exhaust stroke, the inner piston member 98 will stop its outer movement while the outer piston member 86 will be free to move outwardly due to inertial forces to the position shown with respect to the piston assembly of cylinder A. When the outer piston member 86 moves outwardly under its inertial forces, the exhaust valve 110 will, of course, have to close in order to prevent interference.

It will be seen that by delivering the fuel-air mixture or air along in the case of a diesel engine, in the cylinder below the piston and by constructing the piston so as to function as an intake valve, all gas flow within a cylinder is from the inner end thereof to the outer end thereof in a straight line. This provides for maximum flow efficiency. Further, by eliminating the need for the intake valve in the head, this leaves ample room for a large exhaust valve or a plurality of exhaust valves should this be so desired. Thus, there is full freedom of gas flow into and out of each cylinder to obtain a maximum breathing of the engine and, therefore, a maximum efficiency coupled with maximum obtainable horsepower.

Although only a preferred embodiment of the internal combustion engine has been specifically illustrated and described herein, it is to be understood that minor variations may be made in the internal combustion engine without departing from the spirit and the scope of the invention, as defined by the appended claims.

I claim:

1. A method of operating a four stroke cycle internal engine, said method comprising the steps of providing an engine with a piston assembly including an inner piston member connected to a crankshaft and an outer piston member mounted for relative axial movement to in a first position define a gaseous flow path through the piston assembly and in a second position form a seal, supplying at least air to the engine below the piston assembly, and reciprocating the piston assembly through the customary intake, compression, firing a exhause strokes, while maintaining the piston assembly seal during the compression, firing and exhaust strokes and permitting the automatic opening of the gaseous flow path through the piston assembly during the intake stroke, the gaseous flow path being retained opened during the intake stroke by the inner piston member being withdrawn inwardly relative to the outer piston member due to pressure differences between said inner and outer piston members.

2. The method of claim 1 wherein the gaseous flow path is initially opened at the end of the exhaust stroke by inertial movement of the outer piston member beyond the inner piston member.

3. A new article of manufacture comprising a four stroke cycle internal combustion engine including a piston assembly comprising an inner piston member and an outer piston member, said inner piston member including a head and a base and means for connection to a connecting rod, said inner piston member also including a portion surrounding said head defining a valve surface, said outer piston member including a skirt and an annular head having an opening therethrough of a size less than the cross sectional size of said inner piston member, said annular head having an under surface defining a valve seat matching said valve surface for forming a seal between said inner piston member and said outer piston member, and retainer means interlocking said inner piston member and said outer piston member for limited relative axial movement and for controlled selected gaseous flow through said opening, said piston members acting as self actuating means for effecting separation of said piston members only during an intake stroke of said four stroke cycle according to pressure differences between said inner and outer piston members.

4. In the internal combustion engine of claim 3, a cylinder receiving said piston assembly, and means other than said piston assembly for supplying air under pressure to said cylinder below said piston assembly at least during an intake stroke of said piston assembly.

5. In the internal combustion engine of claim 4, said means for supplying air under pressure including a crankcase and means for pressurizing said crankcase.

6. A piston assembly as recited in claim 3 wherein said skirt has an inner cross section of a greater size than the exterior of said inner piston member to define a flow passage around said inner piston member.

7. A piston assembly as recited in claim 6 wherein said skirt inner surface is substantially cylindrical and said inner piston member is generally square for limited guided movement between said inner piston member and said outer piston member.

8. In the internal combustion engine of claim 3 wherein there are four of said piston assemblies, a crankshaft, and connecting rods connecting said piston assemblies to said crankshaft for reciprocation in unison, said crankshaft being of a sectional construction and including a central member having a pair of oppositely extending crank pins, a pair of end members each having a crank pin, the crank pin of each end member longitudinally overlapping a respective crank pin of said central member and being transversely offset therefrom, and a throw member between each end member and said central member, said throw member receiving end portions of respective ones of said crank pins, and releasable securing means receiving respective ones of said crank pins to the respective one of said throw members.

9. In the internal combustion engine of claim 8, a crankcase, means mounting said crankshaft in said crankcase for rotation, said crankcase being cylindrical, and said central member being circular and generally sealed relative to said crankcase to divide said crankcase into two separate chambers each in communication with two only of said piston assemblies.

10. In the internal combustion engine of claim 9, said central member being valve means for directing an air-fuel mixture separately into each of said crankcase chambers in timed relation to the rotation of said crankshaft.

* * * * *